Sept. 18, 1962 R. J. LEVINESS 3,054,470
DISCONNECTING DEVICE FOR IGNITION SYSTEMS
Filed Aug. 9, 1960
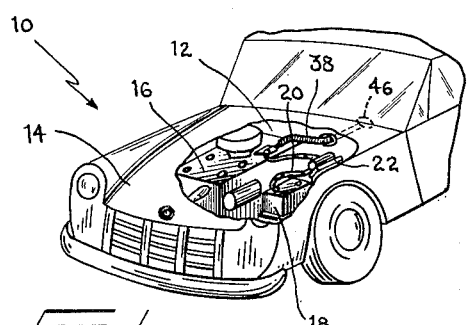
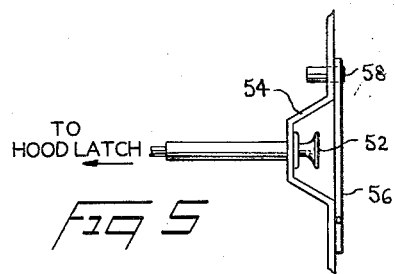
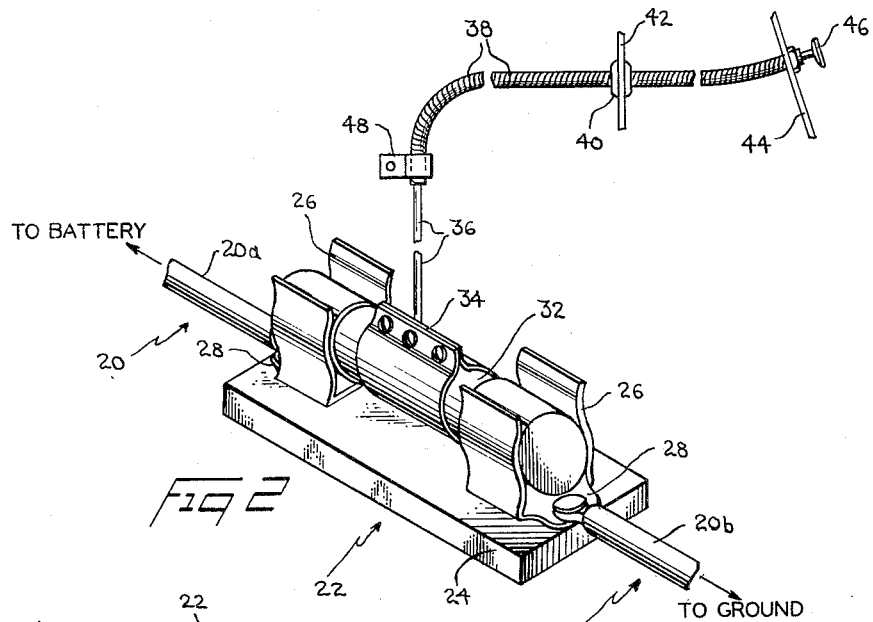
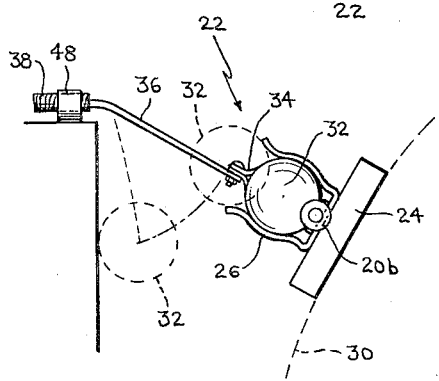
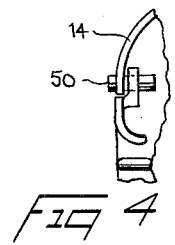
INVENTOR.
REID J. LEVINESS

United States Patent Office 3,054,470
Patented Sept. 18, 1962

3,054,470
DISCONNECTING DEVICE FOR
IGNITION SYSTEMS
Reid J. Leviness, 405 Elliott St., Syracuse, N.Y.
Filed Aug. 9, 1960, Ser. No. 48,410
3 Claims. (Cl. 180—82)

This invention relates generally to engine ignition systems, and has particular reference to an improved device for disconnecting an ignition system in such a manner that unauthorized starting of the engine is positively prevented. More specifically, the invention is directed toward an ignition disconnecting device for use with automotive vehicles although it is not intended that the device be limited to such use since it will be apparent as the description proceeds that it can also be advantageously employed in connection with marine engines, aircraft engines and the like.

In most modern vehicles the ignition system is controlled by a key operated switch and the key is usually removed by the owner when the vehicle is left unattended. However, even without a key, it is relatively simple for an experienced thief to short-circuit the switch and start the engine or motor so that the vehicle can be driven away. In order to eliminate this possibility, the present invention contemplates an arrangement and device whereby the vehicle battery can be disconnected inside the engine compartment of the vehicle and locking means are provided to positively prevent entry into this compartment to restore the battery circuit to operating condition. To this end, the device is arranged so that disconnecting the battery can be effected from a point adjacent the instrument panel as the owner leaves the vehicle, but the disconnecting means cannot be operated to restore the battery connection, it being necessary to do this manually from within the engine compartment.

This arrangement described above has several important advantages and, with reference to theft prevention, one advantage is that the average car thief upon short-circuiting the ignition switch and getting no response whatsoever from the engine will assume that the battery is dead and move on to another vehicle. Moreover, even if the theft ascertains what has actually been done, he is not likely to risk trying to break into the locked engine compartment, which act is certain to be far more obvious than an undercover short-circuiting operation within the shelter of the vehicle interior. In addition to theft considerations, an important advantage of the invention is that it effectively prevents fire losses due to accidental short-circuits in the ignition system, and this may be particularly important when the vehicle is kept in an attached garage or left unattended in any other building for some length of time. The theft and fire prevention aspects of the invention can, of course, result in reduced insurance rates, also.

Accordingly, with the foregoing and other considerations in view, it may be stated that the broad objective of the present invention is to provide an improved disconnecting device for ignition systems which is both practical and effective, it being recognized by the applicant that similar devices have been proposed heretofore that for one reason or another have proved impractical or ineffective.

Another important object of the invention is to provide a device of the character described which by minimizing the possibility of vehicle thefts can effectively aid in combatting juvenile delinquency.

A further important object of the invention is to provide a device of the character described which substantially eliminates the possibility of fire in an unattended vehicle due to defective wiring.

Still another important object of the invention is to provide a device of the character described which is adapted for use in many different types of vehicles and can be easily installed therein with a minimum amount of labor.

A still further important object of the invention is to provide a device of the character described which is simple yet positive in operation.

Another important object of the invention is to provide a device of the character described having an economical yet durable construction.

Other objects and advantages of the invention will become apparent from the following detailed description thereof read in conjunction with the accompanying drawings which illustrate a representative embodiment of the invention for the purpose of disclosure.

In the drawings:

FIGURE 1 is a fragmentary perspective view of a motor vehicle with parts broken away to show the manner in which a disconnecting device embodying the invention might be installed therein;

FIGURE 2 is an enlarged, schematic perspective view of the disconnecting device of the invention and actuating means therefor;

FIGURE 3 is an enlarged end elevation of the device as mounted in the vehicle of FIGURE 1;

FIGURE 4 is an enlarged, fragmentary section through the front portion of the vehicle hood showing the locking means thereon; and FIGURE 5 is an enlarged, fragmentary section through an alternative form of engine compartment locking means.

Having reference now to the drawings, wherein like reference numbers designate the same part in each of the views, 10 indicates a motor vehicle having an engine compartment 12 provided with a closure in the form of a hood 14, a conventional passenger vehicle being shown by way of example. Mounted in the engine compartment in the usual manner are the engine 16 and battery 18, the latter being grounded on one side and connected at its other side to the ignition switch and engine starter (not shown).

In accordance with the invention, the battery 18 is grounded through a heavy conductor 20 which can be broken or opened to render the battery and thus the entire ignition circuit inoperative. To this end, the conductor actually comprises two parts or sections 20a and 20b, the outer ends of which are respectively connected to the ground terminal of the battery and a portion of the vehicle body. The inner ends of conductor sections 20a, 20b are connected to disconnector means indicated generally at 22, FIGURES 2 and 3.

Disconnector means 22 includes a base member 24 of insulating material and a pair of metal spring clips 26 mounted in spaced relation to one another adjacent the ends of the base member as shown. The inner ends of the conductor sections 20a, 20b are in electrical contact with the clips as by being secured to tabs 28 formed integrally with the clip bases. The base member 24 of the disconnector means can be attached by any suitable means to a convenient part of the vehicle body near the battery as, for example, the inside wall of the tire well indicated by broken line 30 in FIGURE 3.

In addition to the base member 24 and clips 26, the disconnector means includes a current carrying element 32 that is normally mounted in a releasable manner in the clips to bridge the space therebetween and provide a continuous current path from the battery to ground. The element 32 can be in the form of a fuse as shown, or it can simply be a length of metal rod or tube which is receivable in the clips. In order to disengage the element 32 from the clips by means of a remotely operable actuator, the element is encircled by a centrally disposed sleeve or yoke member 34 to which is connected one end of a flexible wire 36.

The wire 36 forms a part of a Bowden wire having an outer flexible tube 38 through which the wire 36 passes. The Bowden wire passes through a grommet 40 in the fire wall of the vehicle, indicated fragmentarily at 42 in FIGURE 2, and thence to the dashboard or instrument panel 44. At the dashboard the inner wire 36 is provided with an actuating knob 46 which can be pulled outwardly to disengage the conducting element 32 from the spring clips and thus open the battery-ignition circuit.

Since it is contemplated by the invention that the actuating knob be operable only to disengage the conducting element and not to re-engage same, the device is arranged in the engine compartment to positively prevent the latter. As best shown in FIGURE 3, this is accomplished by orienting the disconnector means and Bowden wire so that the disengaged conductor element swings by gravity out of alignment with the clips. Thus, in the arrangement disclosed in FIGURE 3, the disconnector means is mounted in an obliquely disposed or angularly offset manner and the Bowden wire is arranged so that the pull on the conductor element is from a point above and to one side of the disconnector means. With such an arrangement, the conductor element swings down into the position shown in dash lines in FIGURE 3 as soon as it is pulled clear of the spring clips and no amount of inward pushing on the actuating knob will return it to circuit closing position. In this connection, it will be noted that the end of the Bowden wire adjacent the disconnector means is provided with a small mounting clip 48 for positioning the wire so that it will have the desired direction of pull as described above. Obviously, the wire and disconnector means could be oriented in other ways and still operate in the desired manner as, for example, the disconnector means could have its base member in a vertical position or the unit could even be mounted in an upside down position.

With the above described arrangement, the conductor element 32 must be re-engaged in the spring clips 26 by manual means and to prevent this from being done by unauthorized persons, the combination of the invention includes a lock 50, FIGURE 4, to prevent the hood 14 from being opened. In the alternative, locking means as disclosed in FIGURE 5 may be provided, this type of locking means being usable when the hood is unlatched as by a knob 52 located in the vehicle interior. In such case, the knob can be positioned in a recessed portion 54 of the dashboard which is provided with a hinged cover plate 56 and lock 58.

In the operation of the invention, the hood is normally maintained in a locked condition and when the owner wishes to disconnect the ignition system, he simply pulls outwardly on the actuating knob 46 at the dashboard and this disengages the conductor element 32 from the clips 26 and renders the entire ignition system inoperative. Moreover, since the ignition system can be restored to operating condition only by manual re-engagement of the element and access to the element is only possible by opening the hood, the vehicle engine cannot be started except by breaking open the hood. On the other hand, the owner upon returning to the vehicle needs only to unlock the hood, replace the connector element and then re-lock the hood, which simple operations can be accomplished in less than a minute.

As will be apparent to those familiar with the art, this invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In a disconnecting device for the ignition system of a motor vehicle, said vehicle having an engine compartment, a closure for said engine compartment and a battery forming a part of the ignition system mounted in the compartment: the combination of an insulating member mounted in said compartment adjacent said battery, a pair of spaced, substantially U-shaped spring metal clips mounted on said insulating member, a two-part ground connector for the battery, one part of said connector extending from the ground terminal of the battery to one of said clips and the other part of said connector extending from the other of said clips to ground on the vehicle, said insulating member being mounted in said compartment so that said clips are angularly offset from an upward facing position, a conductor element releasably mounted in said clips to complete the circuit therebetween, a yoke member mounted on said conductor element between said clips, flexible means connected to said yoke member and operable from a point remote from said engine compartment to completely disengage said conductor from said clips, said flexible means being oriented with respect to said clips so that said conductor element is swung by gravity out of alignment with the clips after being disengaged therefrom whereby the flexible means is inoperable to re-engage the element in the clips, and means to lock said engine compartment closure to prevent unauthorized access into the interior of the engine compartment for re-engagement of the conductor element in the clips by manual means.

2. In an engine ignition system including an ignition switch and a source of electrical energy in circuit with said switch: means to open the circuit connecting said switch and source comprising an insulating member supporting a pair of spaced clips connected in said circuit between the switch and source, a conductor releasably mounted in said clips to complete the circuit therebetween, flexible means connected to said conductor and operable from a point remote from said insulating member to disengage said conductor from said clips, and means to orient said disengaging means with respect to said clips whereby said conductor is swung by gravity out of alignment with the clips after being disengaged therefrom; in combination with a housing enclosing said source of electrical energy and said circuit opening means, said housing having a closure, and locking means for said closure to prevent unauthorized access into the interior of the housing.

3. In an ignition system including a current source in circuit with an ignition switch: an open conductor in said circuit bridged by a circuit opening device, said device comprising an insulating support and a pair of resilient holding members mounted in spaced relation on said support, said holding members being of current conducting material and each being connected to one of the free ends of said open conductor, a current carrying element releasably mounted in said holding members to complete the circuit through said open conductor, and means operable at a point remote from said circuit opening device to completely remove said current carrying element from said holding members, said removal means and said circuit opening device being arranged so that said element is swung out of alignment with said holding means and the removal means being inoperative to re-mount the element in the holding means after it has been removed therefrom; in combination with a housing enclosing said current source and said circuit opening device, said housing having a closure, and locking means for said closure to prevent unauthorized access into the interior of the housing.

References Cited in the file of this patent
UNITED STATES PATENTS

| | | |
|---|---|---|
| 1,956,484 | Bate | Apr. 24, 1934 |
| 1,984,921 | Ehrlich | Dec. 18, 1934 |